UNITED STATES PATENT OFFICE.

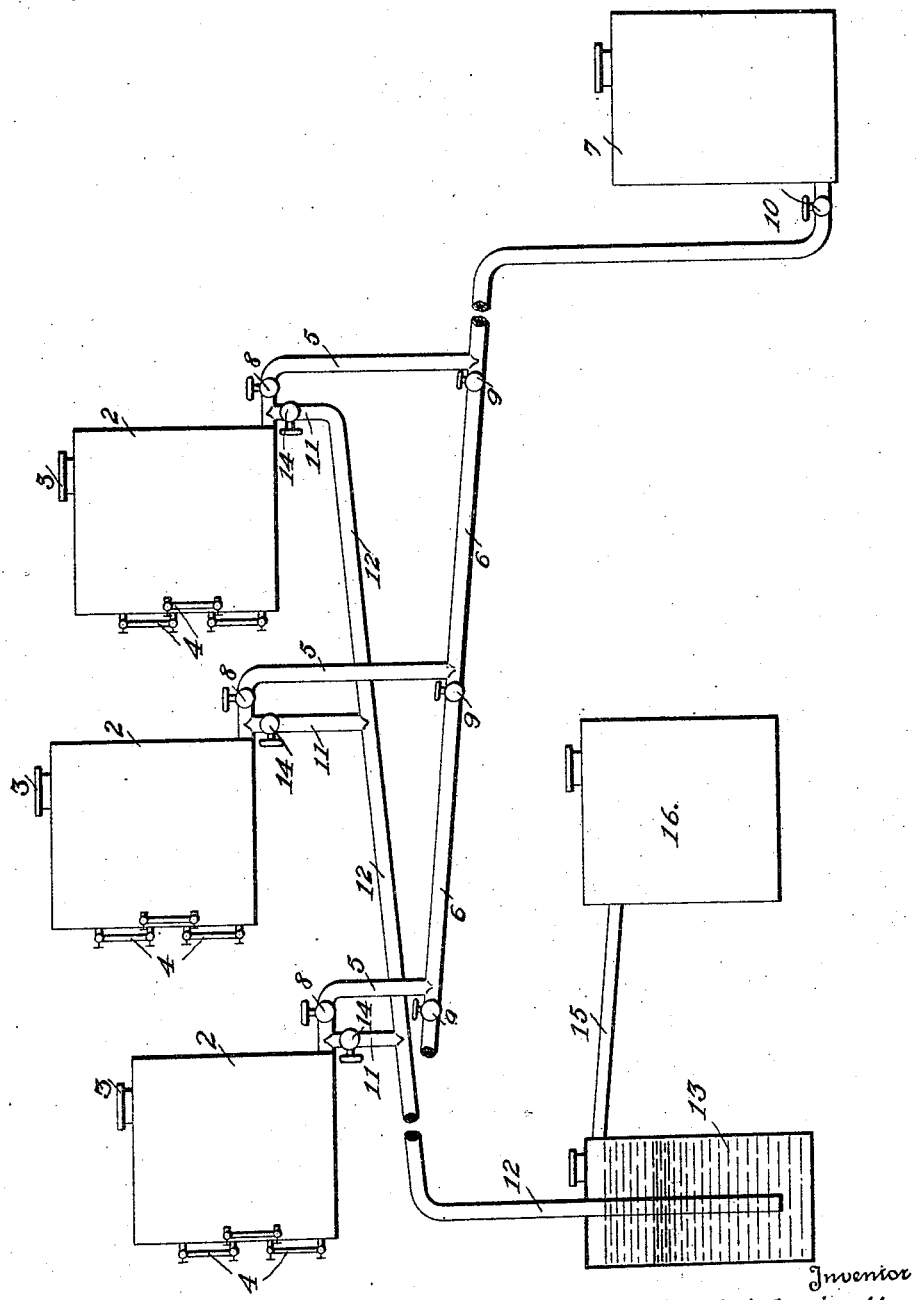

DANIEL ASPINALL, OF VANCOUVER, BRITISH COLUMBIA, CANADA.

OIL-SALVAGING MEANS.

1,414,611.      Specification of Letters Patent.      Patented May 2, 1922.

Application filed March 31, 1921. Serial No. 457,389.

*To all whom it may concern:*

Be it known that I, DANIEL ASPINALL, a citizen of the Dominion of Canada, residing at Vancouver, in the Province of British Columbia, Canada, have invented certain new and useful Improvements in Oil-Salvaging Means, of which the following is a specification.

This invention relates to a provision for salvaging the oil from a burning tank or tanks in an oil refinery or the like, instead of, as at present, allowing the oil to burn itself out while keeping the tank cool with water thrown on it to prevent explosion.

As at present constituted, these tanks may be connected together through the pipes by which oil is delivered for transportation, but although such delivery pipes are there, there is no provision for salvaging the contents of the burning tank through them when such may require to be done.

The invention, therefore, comprises the provision of a supplementary or salvage tank or tanks located at such a lower level from the oil storage tanks in regular use, that the oil will flow by gravity into the salvage tank when required, and provision is made for so connecting any one or any number of the storage tanks to this supplementary or salvage tank.

Provision is also made for withdrawing the final residue of the burning oil from a tank on fire, which it would be dangerous to deliver into the salvage tank and for delivering it through a cooling tank where the hot or burning oil is immediately cooled by passing it through water, and floating on the surface of the water overflows into a second supplementary tank for such re-purification as it may require, as oil which has been in immediate contact with the flame and heat of the fire is discoloured and unfit for sale until it is again purified.

The invention is particularly described in the following specification, reference being made to the drawings by which it is accompanied, in which:

Fig. 1 is a more or less diagrammatic elevation showing a series of the oil storage tanks of a refinery with the emergency storage tank and the several connections which are the particular subject of this application.

In this drawing 2 represents a series of ordinary cylindrical tanks, such as are usually provided for oil storage in a refining plant. These tanks 2 have manholes 3 for ventilation and stepped gauge glasses 4 by which the level of the oil in the tanks may be ascertained.

Supplementary to such pipe connections as may be necessary connecting these tanks for delivery for sale, the bottom of each tank 2 is connected by a pipe 5 to a pipe 6 which may be common to all and delivers into a supplementary or salvage tank 7. This tank 7 is located at a lower level that the oil may flow into it from any of the tanks 2 and is sufficiently remote from them to preclude communication of fire to the tank 7 from any of the tanks 2.

In each pipe 5, adjacent the tank to which it is connected, is a stop valve 8 and between each connection 5 to the pipe 6 is a stop valve 9, and a valve 10 is also provided in the pipe 6 adjacent the connection of that pipe to the salvage tank 7.

From the branch connection 5 of each tank 2 between that tank and the valve 8 which controls passage through the pipe 5, a second supplementary pipe 11 connects each tank 2 to a pipe 12 delivering by gravity into a quenching or cooling tank 13, below the level of water 20 maintained in it, and a stop valve 14 is provided in each pipe 11 adjacent the connection of it to the pipe 5.

From the upper part of the quenching tank 13 an overflow pipe 15 delivers into a second salvage tank 16 for discoloured oil.

In use, assuming the oil in any of the tanks 2 to be on fire or to be threatened by fire the valve 8 of that tank is opened, as also is the valve 10 at the delivery into the salvaging tank 7, while the valve 9 behind the connection 5 of the particular tank on fire is closed. The oil of the fired or threatened tank thus flows out from it through the pipes 5 and 6 into the salvage tank 7 which is sufficiently remote to be safe from communication of the fire to it.

When the level of the oil in the tank 2 which is on fire and which is being emptied into the salvage tank 7, nears the bottom of the tank, the valve 8 is closed and the valve 14 opened, that the residue of the oil in the tank 2, which has been adjacent the burning surface, and which is highly heated and discoloured and is more or less charged with impurities, is delivered through the pipes 11 and 12 into the cooling tank 15 and being delivered below the level of the water 20 retained in that tank is cooled as it rises through the water and overflows through the pipe 15 into the second salvage tank 16, which salvaged oil may be retreated for purification. The impure oil is thus not delivered into the main salvage tank 7 to render it impure.

Obviously if the oil is not burning in the tank 2 from which the oil is withdrawn, the whole of it may be salvaged into the tank 7.

A means is thus provided at a relatively small cost by which a valuable amount of oil may be salvaged during a fire, and not only so but the risk of the fire spreading to the other tanks is very considerably lessened.

Obviously the volume of the tank 7 need not be limited to the capacity of one tank, or more than one salvage tank may be provided.

Having now particularly described my invention, I hereby declare that what I claim as new and desire to be protected in by Letters Patent, is:

1. A means for salvaging oil or the like from any one of a series of storage tanks when the same is threatened by fire, said means comprising a salvaging tank remote from the storage tanks, means for delivering the contents of any storage tank into the salvaging tank, a second salvaging tank located remote from the storage tanks, and means for delivering the residue from any storage tank through a cooling medium into the second salvaging tank.

2. A means for salvaging oil or the like from any one of a series of storage tanks when the same is threatened by fire, said means comprising a salvaging tank remote from the storage tank, means for delivering the contents of any of the storage tanks into the salvaging tank, a second salvaging tank located remote from the storage tanks, and means for separately delivering the residue from any storage tank through a cooling medium into the second salvaging tank.

3. A means for salvaging oil or the like from any one of a series of storage tanks when the same is threatened by fire, said means comprising a salvaging tank remote from the storage tank, a quenching tank remote from the storage tank, a second salvaging tank adjacent the quenching tank, means for delivering the contents of any one of the storage tanks into the first named salvaging tank, means for controlling such delivery, means independent of the delivery into the first salvaging tank for delivering the residual contents of any of the storage tanks into the quenching tank, and means for delivering the overflow of the quenching tank into the second salvage tank.

In testimony whereof I affix my signature.

DANIEL ASPINALL.